(12) United States Patent
Serbinski (10) Patent No.: US 9,802,666 B2
(45) Date of Patent: Oct. 31, 2017

(54) MULTIFUNCTIONAL HAND GUARD

(71) Applicant: Andrew Serbinski, Annandale, NJ (US)

(72) Inventor: Andrew Serbinski, Annandale, NJ (US)

(*) Notice: Subject to any disclaimer, the term of this patent is extended or adjusted under 35 U.S.C. 154(b) by 0 days.

(21) Appl. No.: 14/121,109

(22) Filed: Aug. 1, 2014

(65) Prior Publication Data

US 2016/0031510 A1  Feb. 4, 2016

(51) Int. Cl.
*B62K 21/12* (2006.01)
*B62J 23/00* (2006.01)
*B62J 27/00* (2006.01)

(52) U.S. Cl.
CPC .............. *B62J 23/00* (2013.01); *B62J 27/00* (2013.01)

(58) Field of Classification Search
CPC ............ B62K 21/125; B62J 11/00; B62J 6/00
USPC ....................................... 74/551.8
See application file for complete search history.

(56) References Cited

U.S. PATENT DOCUMENTS

| | | | |
|---|---|---|---|
| 2,063,493 A | 12/1936 | Douglas | |
| 2,591,523 A | 4/1952 | Dick | |
| 3,462,188 A | 8/1969 | Edgar | |
| 3,832,912 A | 9/1974 | Edwards | |
| 3,834,249 A | 9/1974 | Bothwell | |
| 4,141,567 A | 2/1979 | Scott | |
| 4,438,661 A | 3/1984 | Cullen | |
| 4,716,782 A | 1/1988 | Jones | |
| D319,992 S | 9/1991 | Acerbis | |
| D549,619 S | 8/2007 | Jacob | |
| 7,644,642 B2 | 1/2010 | Paris et al. | |
| 8,408,093 B2 | 4/2013 | Brumana et al. | |
| 2004/0173046 A1* | 9/2004 | Hancock et al. | 74/551.8 |
| 2004/0217243 A1 | 11/2004 | Laivins et al. | |
| 2007/0256514 A1* | 11/2007 | Laivins | B62J 17/00 74/551.8 |
| 2008/0141821 A1* | 6/2008 | Degarate | B62J 23/00 74/551.8 |
| 2008/0203762 A1* | 8/2008 | Shimanski | 296/180.1 |
| 2009/0007720 A1* | 1/2009 | Tung | B62J 23/00 74/551.8 |
| 2009/0314125 A1 | 12/2009 | Mentasi | |
| 2010/0180716 A1* | 7/2010 | Brumana et al. | 74/551.8 |
| 2012/0234129 A1 | 9/2012 | Adan | |
| 2012/0279348 A1 | 11/2012 | Wood | |
| 2014/0260772 A1* | 9/2014 | Dion | 74/551.8 |

FOREIGN PATENT DOCUMENTS

| | | | | |
|---|---|---|---|---|
| FR | 2980161 A1 | * | 3/2013 | |
| GB | 636349 A | * | 4/1950 | |
| GB | 2490496 A | * | 11/2012 | B62J 6/02 |
| JP | 10297568 A | * | 11/1998 | |
| WO | WO 2008010245 A1 | * | 1/2008 | B62J 23/00 |
| WO | WO 2012127070 A1 | * | 9/2012 | |

* cited by examiner

*Primary Examiner* — Vicky A Johnson
(74) *Attorney, Agent, or Firm* — Kenneth Glynn (57) ABSTRACT

A multifunctional hand guard for a vehicle with a handlebar, said guard having at least three functional modes. The multifunctional hand guard includes: (a) a main hand guard body structure; (b) a cut out cover (insert); and (c) an adjustable guard shield, as well as attachment mechanisms. The cover may be inserted or removed and the shield may be up, down or in between or it may be removed, depending on weather conditions and the desire of the user.

16 Claims, 11 Drawing Sheets

MULTIFUNCTIONAL HAND GUARD

BACKGROUND OF INVENTION a. Field of Invention

The present invention relates generally to hand guards for vehicles with handlebars, including ATVs, motorcycles, scooters, bicycles, jet skis, and the like. The present invention hand guards are attachable to the handlebars and have at least three different modes of use, due to the combination of a moveable insert or cover, as well as a moveable shield. The term "moveable" as used herein should be taken to include rotatable, as with hinged elements, slideable, as with tracked elements, and includes removable. In some embodiments, the present invention hand guard may also include reflectors, decorative lights and/or signal lights.

b. Description of Related Art

The following patents are representative of the field pertaining to the present invention:

United States Patent Application Publication No. 2012/0279348 A1 to Wood describes a lever guard for handlebar of a motorcycle that includes a clamp, secured to the cylindrical surface of the handlebar of the motorcycle, and a guard portion that is bolted to the clamp. The clamp is placed outside of the grips of the motorcycle. The guard provides protection for both the clutch and brake levers of the motorcycle, which are generally mounted on the handlebar of conventional motorcycles. When riding a motorcycle, a rider may accidentally come into contact with either stationary objects, other riders, or other vehicles, resulting in the accidental application of the brake or clutch lever. In competition, this contact is quite frequent. The lever guard helps to prevent this contact by serving as a barrier between the clutch or brake lever and any other rider or object.

United States Patent Application Publication No. 2012/0234129 A1 to Adan describes an improved hand guard assembly that comprises a main body portion, a clamp, and an arm member. A hinge joint assembly pivotally connects the arm member to a second end of the main body portion. The clamp connects a handlebar to a first end of the main body portion. A coil spring of the hinge joint assembly restricts the free rotation of the arm member relative to the main body portion about a central axis. In a frontal accident or sudden deceleration of the vehicle, the operator's arms may hit the shield attached to the arm member in a forward direction imparting a forward force and rotating the arm member about the hinge joint assembly. The operator may then be thrown clear from the vehicle, preventing additional injuries that can occur when an operator's arms are caught between conventional hand guards and the handlebars.

United States Patent Application Publication No. 2009/0314125 A1 to Mentasi describes a hand guard for a grip and lever terminal of a motorcycle handlebar, including a convex outer surface (lout) guard having a bracket protrusion extending from its rear surface for fixing the guard to the handlebar, comprises a monodirectional, limited rotation joint between the fixing bracket and the guard for allowing downward rotation by at least 80.degree., contrasted by an elastic element. The hand guard may optionally further comprise a second monodirectional, limited rotation joint allowing a relative rotation of the first joint (5) and guard (1) assembly around a vertically oriented axis of rotation monodirectionally toward the front wheel fork head of the motorcycle.

United States Patent Application Publication No. 2009/0007720 A1 to Tung describes a protection guard for vehicle handlebar, which is mounted on a handlebar, includes a fixing arm having an arm body mounted on the handlebar, an arm-to-bracket conjunction portion formed on another end opposite to the handlebar; an adjusting bracket having a bracket body formed of "L" shape, a bracket-to-arm conjunction portion formed on an end of the bracket body, at least two thread holes formed on the bracket-to-arm conjunction portion, a bracket-to-cover joining portion formed on another end, the arm-to-bracket conjunction portion of the fixing arm is threaded to one of the thread holes; and a cover having a cover body, a cover-to-bracket joining portion formed on the cover body and connected to the bracket-to-cover joining portion of the adjusting bracket; thereby, when the adjusting bracket turned around or moved to change the position of the thread hole relative to the arm-to-bracket conjunction portion of the fixing arm, the cover then having variety locating position relative to the handlebar.

United States Patent Application Publication No. 2008/0141821 A1 to Degarate et al. describes an integrated hand and controls protection system for vehicles utilizing handlebars for steering, consisting of: hand/controls guards (guards), integral/stowable mirror assembly, damper mount, display guard and integral electrical accessory mounting provisions.

United States Patent Application Publication No. 2004/0217243 A1 to Laivins et al. describes an ATV clamp assembly. The clamp assembly includes a central body having a handlebar leg and a hand guard leg, a handlebar clamp pivotally connected to the handlebar leg and removably clamped to the ATV's handlebar and a hand guard member pivotally connected to the hand guard leg and removably connected to the hand guard. Also addressed is a motorcycle clamp assembly including a handlebar clamp removably connected to the motorcycle's handlebar and having a generally rectangular shape with rounded ends and having a tapered aperture configured to mate with handlebar's tapered portion, and a hand guard member connected to the hand guard and pivotally connected to the handle bar clamp. A method for manufacturing hand guards is disclosed. Using that method, one or more bends are cut in the X-Y plane and a bender is used to form at least one bend in the Z-axis.

U.S. Pat. No. 8,408,093 to Brumana et al. describes a protection device for the ends of a handlebar of a motorcycle, of the type comprising a protection member which can be attached to the ends of said handlebar, which comprises a structural protection member which can be attached with an attachment portion to the ends of said handlebar, and having an aerodynamic guard intended to be positioned in front of an actuation lever of said handlebar of the motorcycle, the aerodynamic guard being configured to reduce the dynamic pressure downstream thereof.

U.S. Pat. No. 7,644,642 B2 to Paris et al. describes a top clamp for steering systems used in cycles, such as motorcycles. The top clamp may be adapted to allow a hand guard crossbar to couple directly thereto. The top clamp may also have a steering damper mount plate adjustably coupled thereto to enable the movement of the handlebars from a forward position to a rearward position without causing the steering damper to move from axial alignment with the axial center of a steering tube.

U.S. Design Pat. No. D549,619 S to Jacobs describes the ornamental design for a hand guard, as shown and described in the drawings thereof.

U.S. Pat. No. Des. 319,992 to Acerbis illustrates the ornamental design for a pair of mountain bike handguards, as shown and described in the drawings thereof.

U.S. Pat. No. 4,716,782 to Jones describes an improved pull loop safety handle for motorcycles. The handle is of the type which includes a pivot point connectable to the handle bars of a motorcycle, bicycle scooter, all terrain vehicle or quad. A cable connection fitting is positioned on the handle and the improvement includes a continuation of the arm into a closed loop having an inner opening sufficiently large for the user's fingers to extend therein.

U.S. Pat. No. 4,438,661 to Cullen describes a protector for the hand of a rider mounted on a bicycle or motorcycle which is of semi-circular shape having an arcuate midsection terminating at its opposite ends in retainers for detachably mounting onto the handlebar of the vehicle about the handgrips thereof. The retainer at one end is of the C-clamp variety having fasteners securing the clamp to the handlebar while the other retainer is an inwardly projection adapted to cooperate with the open bore terminating end of the handlebar to hold or retain the protector in position.

U.S. Pat. No. 4,141,567 to Scott describes rigid protective coverings for the hands when operating a handle bar controlled vehicle that are attached securely to the vehicle and allow convenient access for the operator.

U.S. Pat. No. 3,834,249 to Bothwell describes a handlebar for a motor cycle or the like, which has at one or each end thereof a hand-grip portion and a generally U-shaped rigid guard. The two ends of the guard are connected to the handlebar at respectively opposite ends of the hand-grip portion so that when the handlebar is in use the guard projects forwardly of the hand grip portion and defines with the latter an opening for a rider's hand gripping said portion, whereby the guard affords protection for the hand in the event of a crash. The guard is provided with a covering of resiliently deformable material. The covering extends around the part of the handlebar to which the inner end of the guard is secured and the outer end of the guard is connected to the outer end of the handlebar by a removable plate. The covering is recessed to receive the free end of a pivotable control lever whilst permitting movement of the lever relative to the hand-grip portion.

U.S. Pat. No. 3,832,912 to Edwards describes a handlebar safety shield fitted about the gripping control surfaces of a motorcycle handlebar in a manner to provide a protective shield for the hands of the motorcycle operator and to the hand controls of the motorcycle.

U.S. Pat. No. 3,462,188 to Edgar describes a device adapted to be secured to the handle bars of a bicycle or tricycle to protect the rider from the wind and also protects his hands. This device also has a special appearance which encourages young riders to use same and enables him to participate in various games with other riders.

U.S. Pat. No. 2,591,523 to Dick et al describes a hand protector grip and more specifically pertains to a combined grip and hand guard for engaging in the end of a rod to form a handle.

U.S. Pat. No. 2,063,493 to Douglas describes improvements in cycle handles and more particularly to an improved form of guard for the handle bars of motor cycles.

Notwithstanding the prior art, the present invention is neither taught nor rendered obvious thereby.

SUMMARY OF INVENTION

The present invention is directed to a multifunctional hand guard for a vehicle with a handlebar, said guard having at least three functional modes. The present invention multifunctional hand guard includes: (a) a main hand guard body structure; (b) a cut out cover (insert); and (c) an adjustable guard shield, as well as attachment mechanisms. The main hand guard body structure is adapted for attachment to a vehicle handlebar, the structure having a top, a bottom, a front, a back, a first side and a second side, the structure having a leading segment for positioning in front of a grip of the handlebar, the leading segment having a forward facing cutout, the structure having at least one trailing segment that extends backwardly from the leading segment for attachment to the handlebar, the structure having attachment means for attachment to the handlebar. The cutout cover is moveably attachable to the main hand guard body structure at the cutout, and has a first position wherein the cutout is closed and has a second position wherein the cutout is open for free air flow therethrough. The adjustable guard shield is moveably attachable to the main hand guard body structure at the leading segment and has a first position wherein the guard shield is in a contracted position, and has a second position wherein the guard shield is in a fully extended position so as to increase shielding area for increased hand protection, and has a third position wherein the guard is removed from the structure. In most embodiments the shield may also be positioned anywhere between its contracted position and its fully extended position so as to offer infinite intermediate possibilities for the user. Thus, the multifunctional hand guard has at least three functional modes, including a first mode with the cutout cover in its first position to cover the cutout and the guard shield is in its first position to be contracted, a second mode with the cutout cover in its first position to cover the cutout and the guard shield is in its second position to be extended so as to increase forward shielding area for increased hand protection, and a third mode with the cutout cover in its second position wherein the cutout is open for free air flow therethrough and the guard shield is removed.

In some embodiments of the present invention multifunctional hand guard having at least three functional modes, the trailing segment of the structure has an orifice for attachment to a handlebar. In some of these embodiments, the orifice is established by segmented parts and includes an attachment mechanism to attach the segmented parts to one another. In other embodiments, the attachment means may be a two piece yoke, or any other known attachment mechanism for attachment of accessories to handlebars may be used.

In some embodiments of the present invention multifunctional hand guard having at least three functional modes, the guard shield is removable.

In some embodiments of the present invention multifunctional hand guard having at least three functional modes, the cutout cover has at least one forward facing illumination component selected from the group consisting of reflectors, decorative lighting, directional lights and combinations thereof.

In some embodiments of the present invention multifunctional hand guard having at least three functional modes, the leading segment has at least one forward facing illumination component selected from the group consisting of reflectors, decorative lighting, directional lights and combinations thereof.

In some embodiments of the present invention multifunctional hand guard having at least three functional modes, the structure side has at least one side facing illumination component selected from the group consisting of reflectors, decorative lighting, directional lights and combinations thereof.

In some embodiments of the present invention multifunctional hand guard having at least three functional modes, the main hand guard body structure is symmetrical at least along a horizontal center line so as to be invertible and thereby useable on ether a left side or a right side of the handlebar.

In some embodiments of the present invention multifunctional hand guard having at least three functional modes, the guard shield in its first position extends upwardly above the main hand guard body structure.

In some embodiments of the present invention multifunctional hand guard having at least three functional modes, there is a second adjustable guard shield attached to the structure in a manner so that one may be raised and the other may be lowered to second positions to further increase shielding area for increased hand protection.

In some embodiments of the present invention multifunctional hand guard having at least three functional modes, the structure is of a material selected from the group consisting of plastic, aluminum, fiber and combinations thereof. In some embodiments of the present invention multifunctional hand guard having at least three functional modes, the structure is an aluminum structure selected from the group consisting of cast aluminum, forged aluminum and machined aluminum.

In some embodiments of the present invention multifunctional hand guard having at least three functional modes, the attachment means for attachment to the motorcycle handlebar are adjustable in length.

In other embodiments, the present invention is a combination of a handlebar for steering a vehicle and two multifunctional hand guards having at least three functional modes attached to the handlebar. The handlebar has a left side and a right side, and is attached to a vehicle that is steerable with the handlebar; and the two multifunctional hand guards are attached as follows: one is attached to the left side of the handlebar and one is attached to the right side of the handlebar. Each of the two multifunctional hand guards include all of the various features, embodiments, options and variations set forth above and function in the same manner.

Additional features, advantages, and embodiments of the invention may be set forth, included or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 10 is a top view thereof; and, FIG. 11 shows a block diagram illustrating various components, alternatives and options for the present invention multifunctional hand guard.

DETAILED DESCRIPTION OF THE EMBODIMENTS

Referring now in detail to the drawings wherein like reference numerals designate corresponding parts throughout the several views, various embodiments of the present invention are shown.

Figure 1:
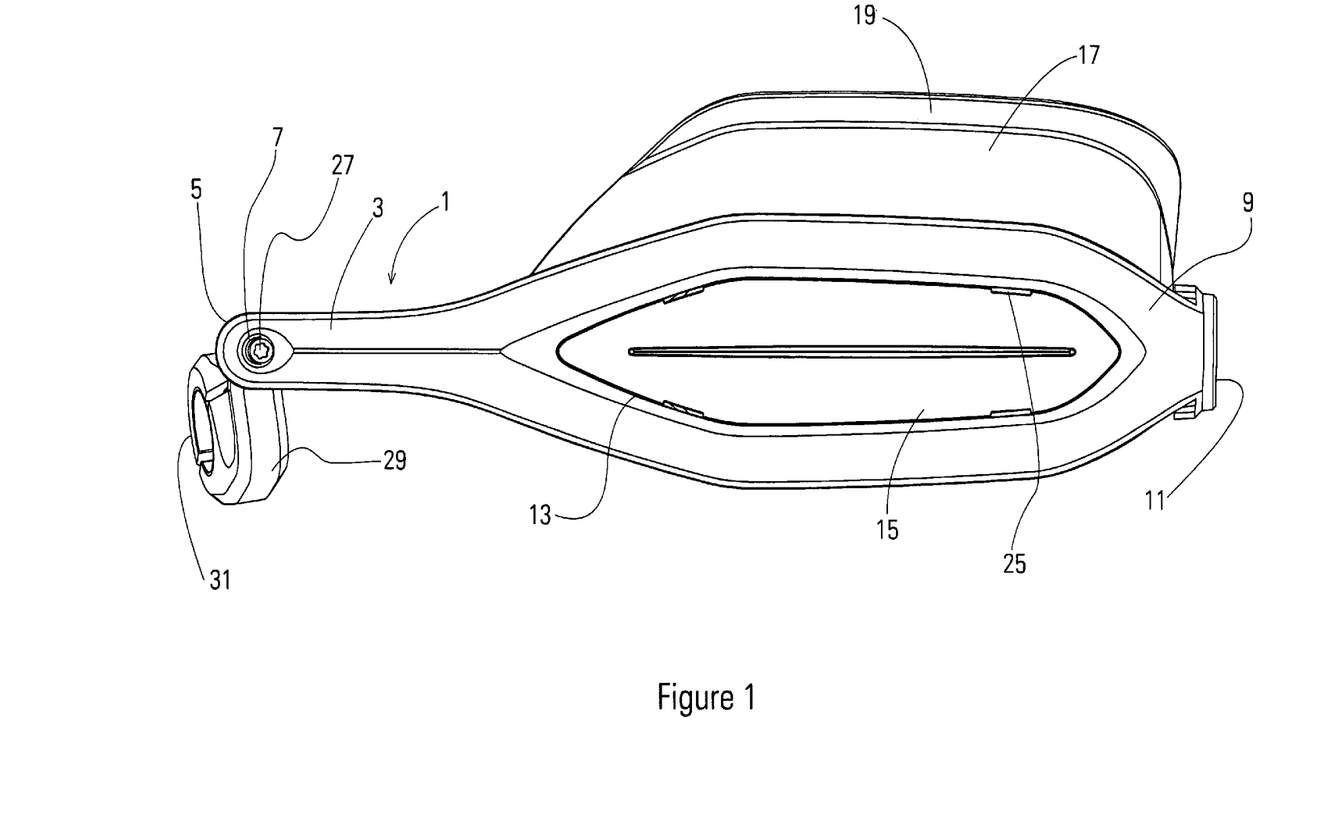
FIG. 1 shows a front view of a present invention multifunctional hand guard for handlebars.

FIG. 1 shows a front view of a present invention multifunctional hand guard 1 for handlebars (not shown here) that are used on vehicles that are steered by the handlebars. Guard 1 includes at least three functional modes, and is adapted for attachment to a vehicle handlebar. Guard 1 includes a main hand guard body structure 3, the structure having a top, a bottom, a front, a back, a first side and a second side, as shown. The main body structure 3 has a leading segment 13 for positioning in front of a grip of the handlebar, the leading segment 13 having a forward facing cutout (cutout 41 in FIG. 6), the structure 3 having at least one trailing segment 9 that extends backwardly from the leading segment 13 for attachment to a handlebar. In this embodiment, the structure 3 has attachment means for attachment to a handlebar that includes a handlebar orifice 11 (clearly shown in detail in FIG. 3) on the inside and an adjustable locking component 29 that terminates in a split ring with a clamping top section 31 on the outside (away from the center of a handlebar to which it may be attached) for attachment to a handlebar. At the end 5 of leading segment 13 is a connection orifice 7 and a locking screw or bolt 27 that locks into and secures component 29 to the guard 1.

Figure 6:
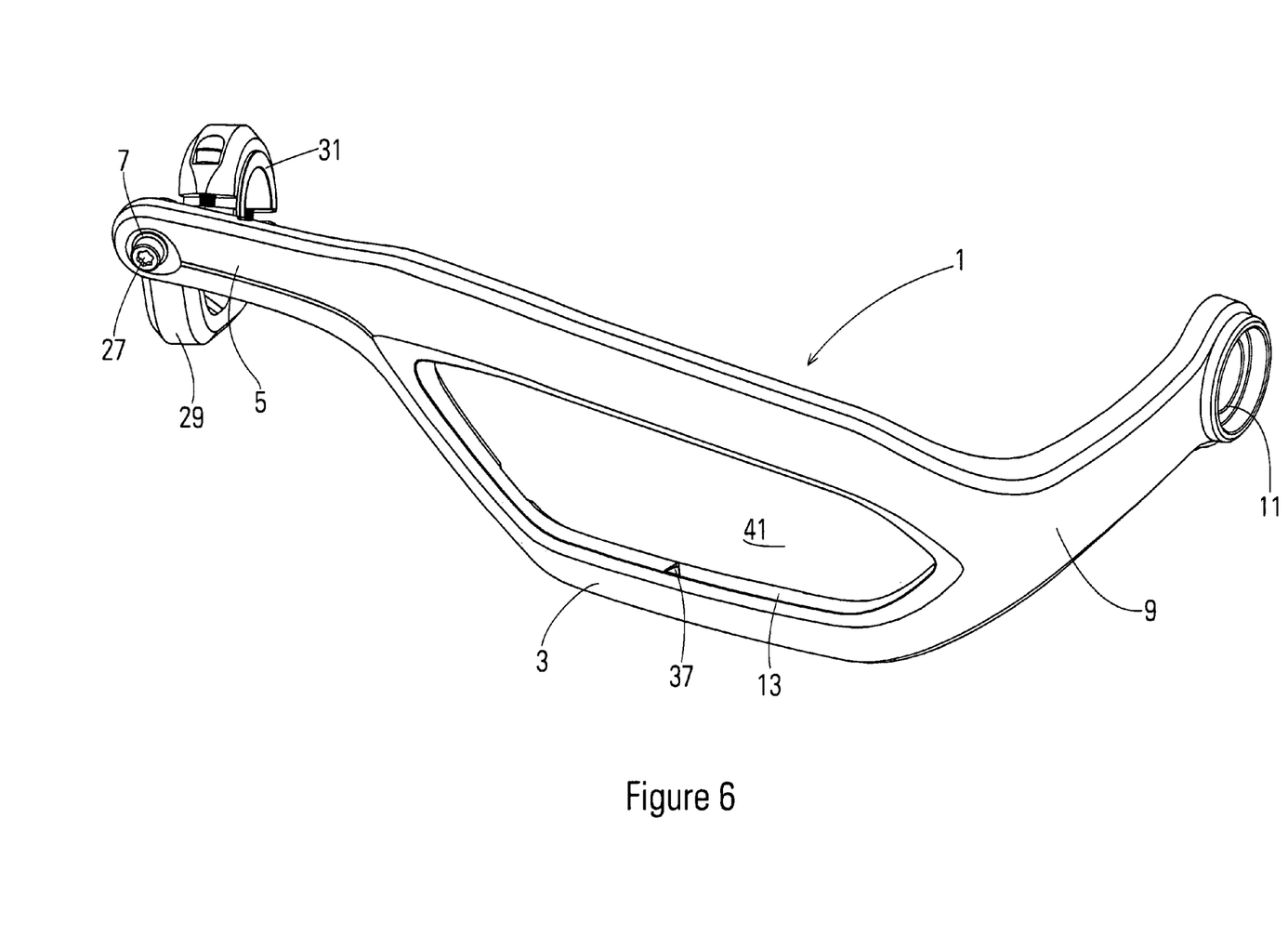
FIG. 6 illustrates an oblique view of the present invention multifunctional hand guard in FIG. 1, but with both the insert cover and the shield removed for maximum air flow.

A cutout cover 15 that is moveably attachable to the main hand guard body structure 3 at the cutout, has a first position wherein the cutout is closed, as shown here and has an second position wherein the cutout is open for free air flow therethrough (see FIG. 6). The cutout cover could be hinged or tracked, e.g., for downward opening movement, but here it is removable for opening the cutout. Detents, such as detent 25 are in place to help position and secure cover 15 in its place.

An adjustable guard shield 17 is moveably attachable to the main hand guard body structure 3 at the leading segment 13 and has a first position wherein the guard shield 17 with wind deflector edge 19 is in a contracted position (as shown in this FIG. 1), and has a second position wherein the guard shield 17 is in an extended position so as to increase shielding area for increased hand protection (see FIG. 4), and has a third position wherein the guard shield 17 is removed from the structure (see FIG. 6).

Thus, the multifunctional hand guard of the present invention has at least three functional modes, including a first mode with the cutout cover in its first position to cover the cutout and the guard shield is in its first position to be contracted, a second mode with the cutout cover in its first position to cover the cutout and the guard shield is in its second position to be extended so as to increase forward shielding area for increased hand protection, and a third mode with the cutout cover in its second position wherein the cutout is open for free air flow therethrough and the guard shield is removed.

Figure 2:
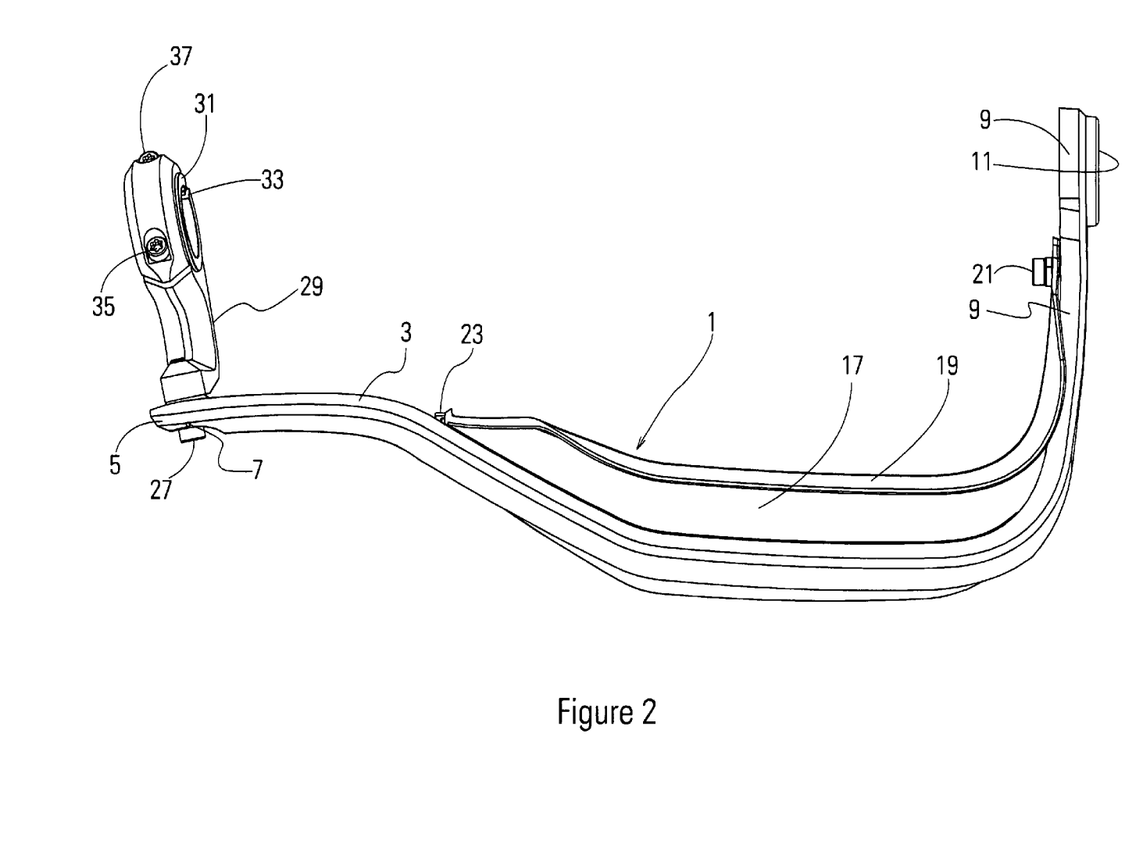
FIG. 2 is a top view of the present invention multifunctional hand guard shown in FIG. 1 above.

FIG. 2 is a top view of the present invention multifunctional hand guard 1 shown in FIG. 1 above, with identical parts identically numbered. In this FIG. 2, exemplary attachment details are revealed. The shield 17 is movably, as well as removably, secured by quick release screw 21 and snap fitting 23. The top section 31 of component 29 is secured by screws 35 and 37.

Figure 3:
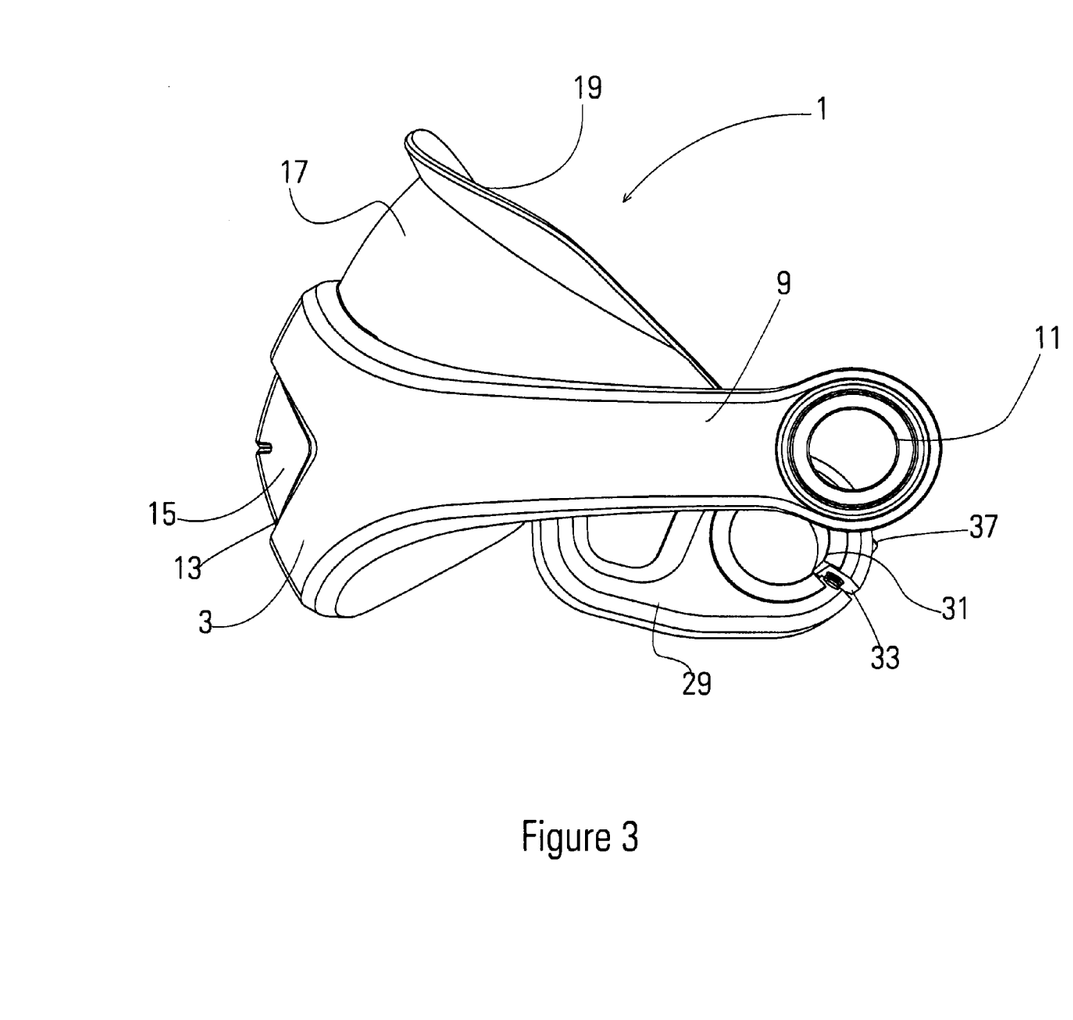
FIG. 3 is a side view of the present invention multifunctional hand guard shown in FIG. 1 above.
Figure 4:
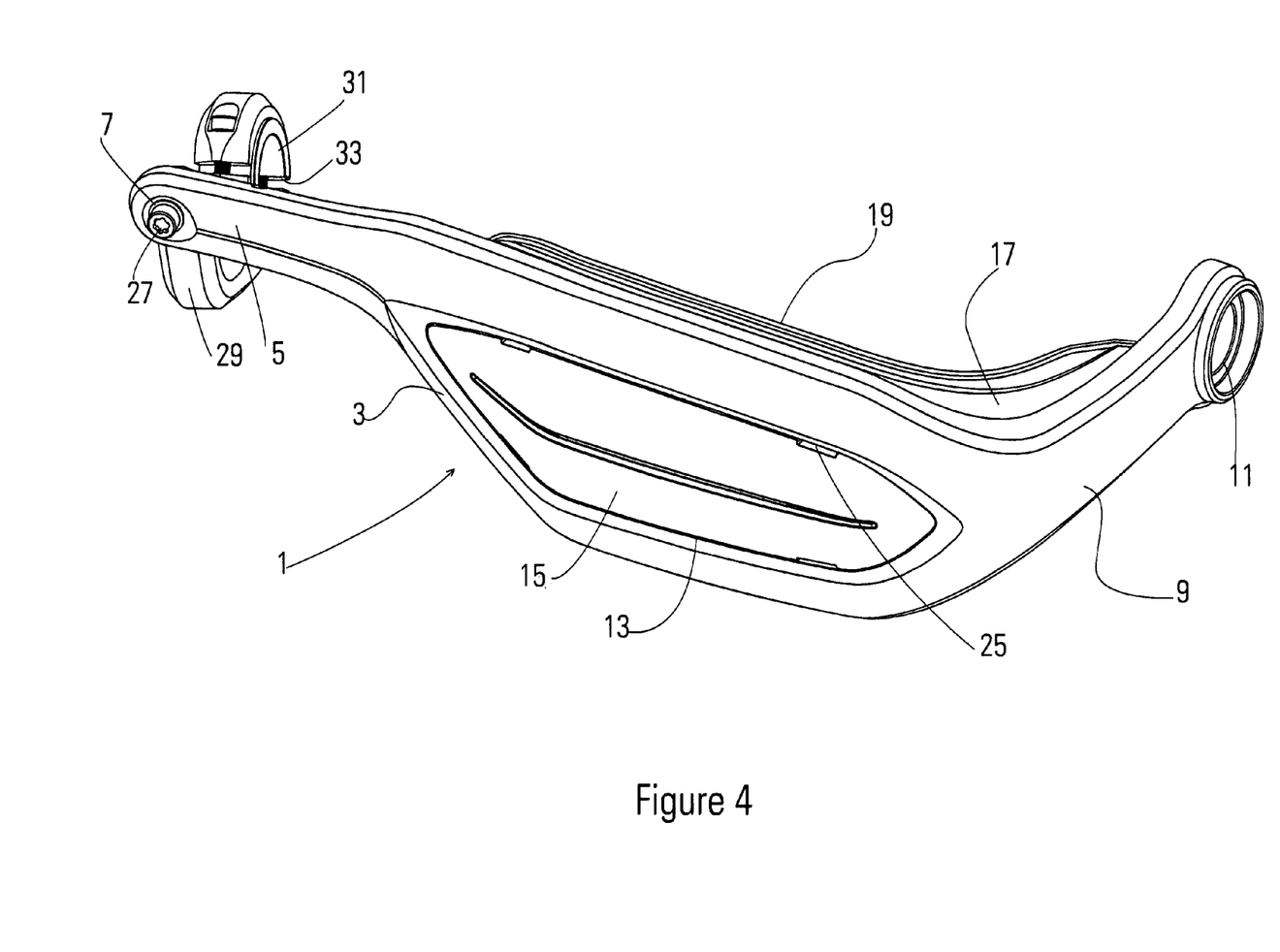
FIG. 4 shows an oblique view of the present invention multifunctional hand guard of FIG. 1 with the shield down and the insert cover in place.

FIG. 3 is a side view of the present invention multifunctional hand guard 1 shown in FIGS. 1 and 2 above and FIG. 4 shows an oblique view of the present invention multifunctional hand guard 1 of FIGS. 1, 2 and 3 with the shield 17 down and the insert cover 15 in place.

Figure 5:
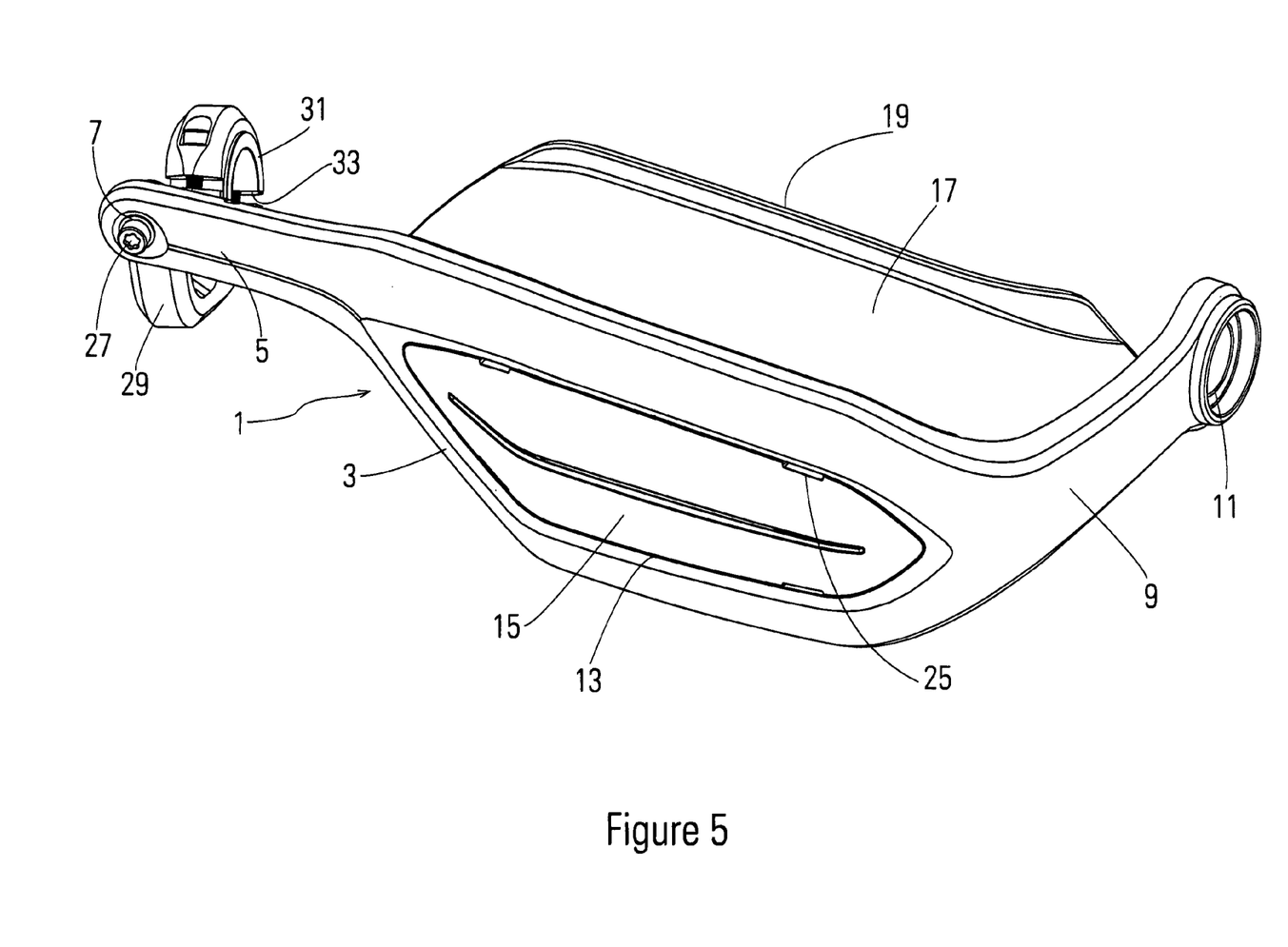
FIG. 5 shows an oblique view of the present invention multifunctional hand guard of FIG. 1 with the shield up and the insert cover in place for maximum shielding protection.

FIG. 5 shows an oblique view of the present invention multifunctional hand guard 1 of the foregoing Figures with the shield 17 up and the insert cover 15 in place for maximum shielding protection;

FIG. 6 illustrates an oblique view of the present invention multifunctional hand guard 11 in FIG. 1, but with both the insert cover 15 and the shield 17 removed for maximum air flow, as shown.

Figure 7:
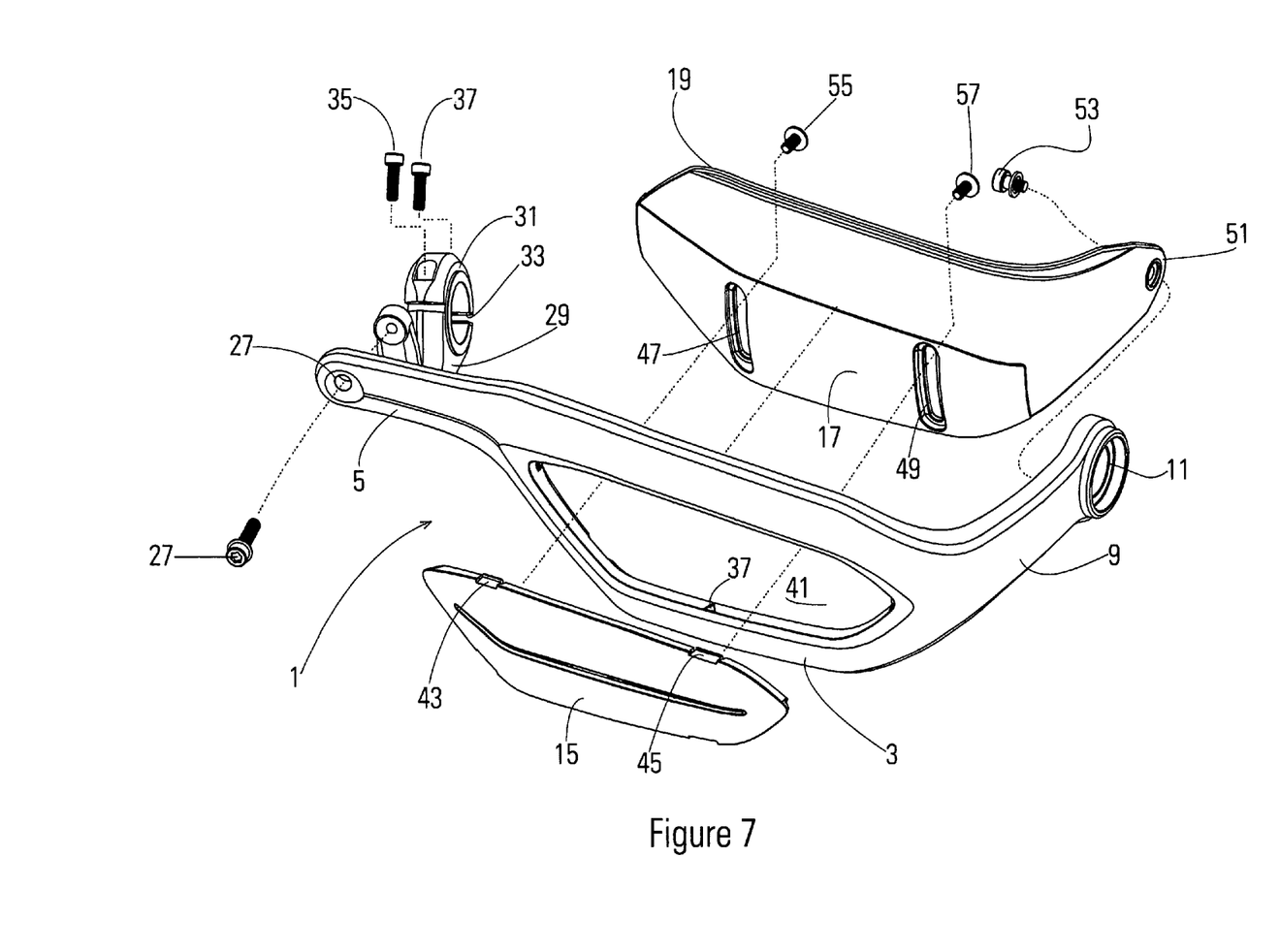
FIG. 7 is an exploded front oblique view of the present invention multifunctional hand guard in FIG. 1 with the various components and assembly elements illustrated.

FIG. 7 is an exploded front oblique view of the present invention multifunctional hand guard 1 shown in the preceding Figures with the various components and assembly elements illustrated. The elements that are identical to those above are identically numbered. In addition to the previously mentioned components, there are shown shield assembly orifice 51, shield tracks 47 and 49 and track screws 55 and 57. Also shown are cutout 41 with detent 37 and cover 15 with spring locks 43 and 45 that cooperate with detents, such as detent 25 (FIG. 1).

Figure 8:
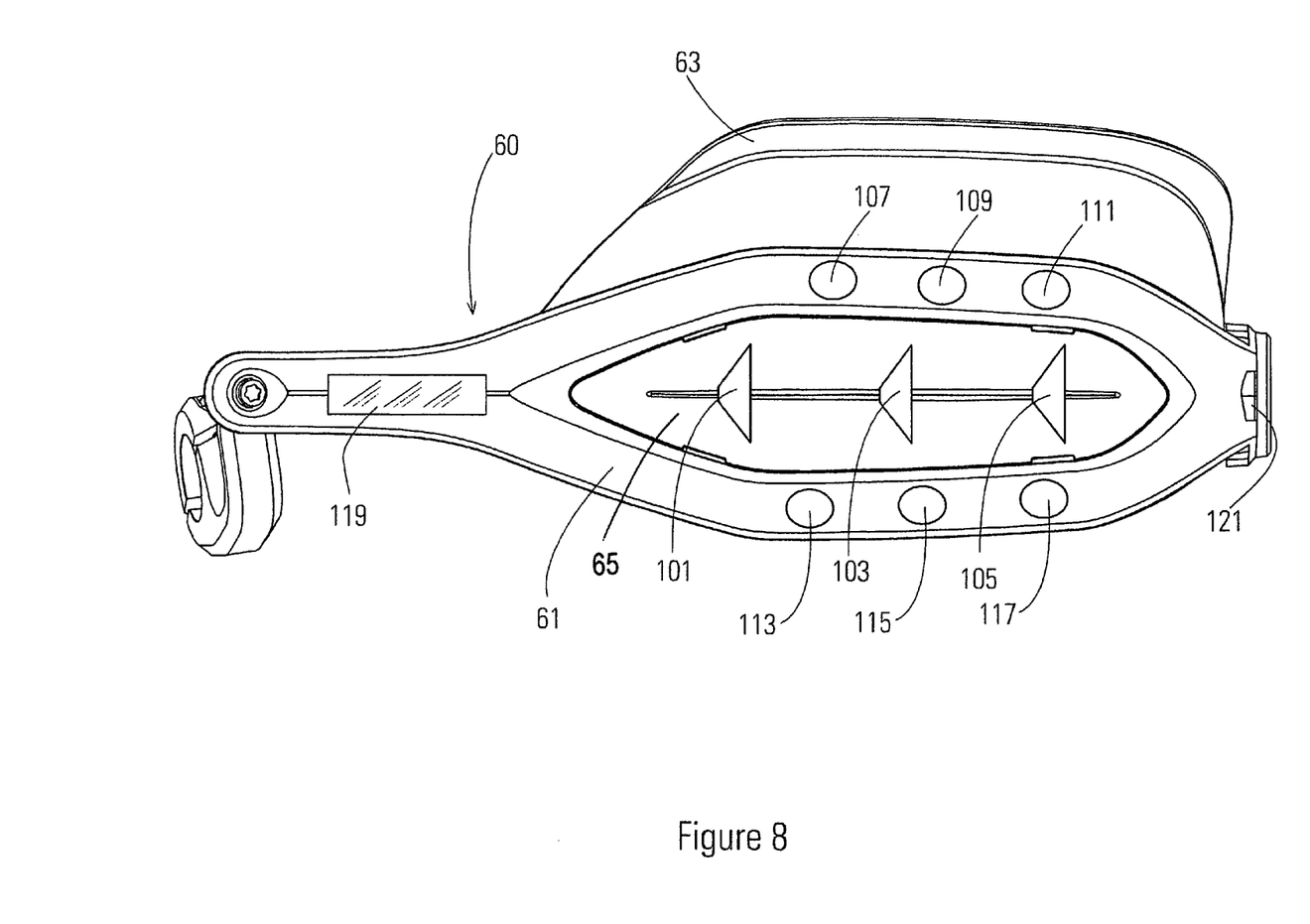
FIG. 8 shows a front view of another present invention multifunctional hand guard for handlebars, show various illumination and reflector possibilities.

FIG. 8 shows a front view of another present invention multifunctional hand guard 60 for handlebars, show various illumination and reflector possibilities. In this embodiment, there are the three essential components, namely, the main body structure 61, the shield 63 and the insert cover 65, that may have the same or similar details to the present invention guard shown above. In addition, cover 65 includes directional lights 101, 103 and 105, that may be wired with quick disconnections and may be in addition to or in place of other front directional lights. Further, structure 61 includes battery illuminated decorative lights, such as LED lights 107, 109, 111, 113, 115 and 117, as well as front reflector 119 and side reflector 121. These may be alternatively arranged, such as decorative lights on the top of the shield 63 and reflectors on the cover 65.

Figure 9:
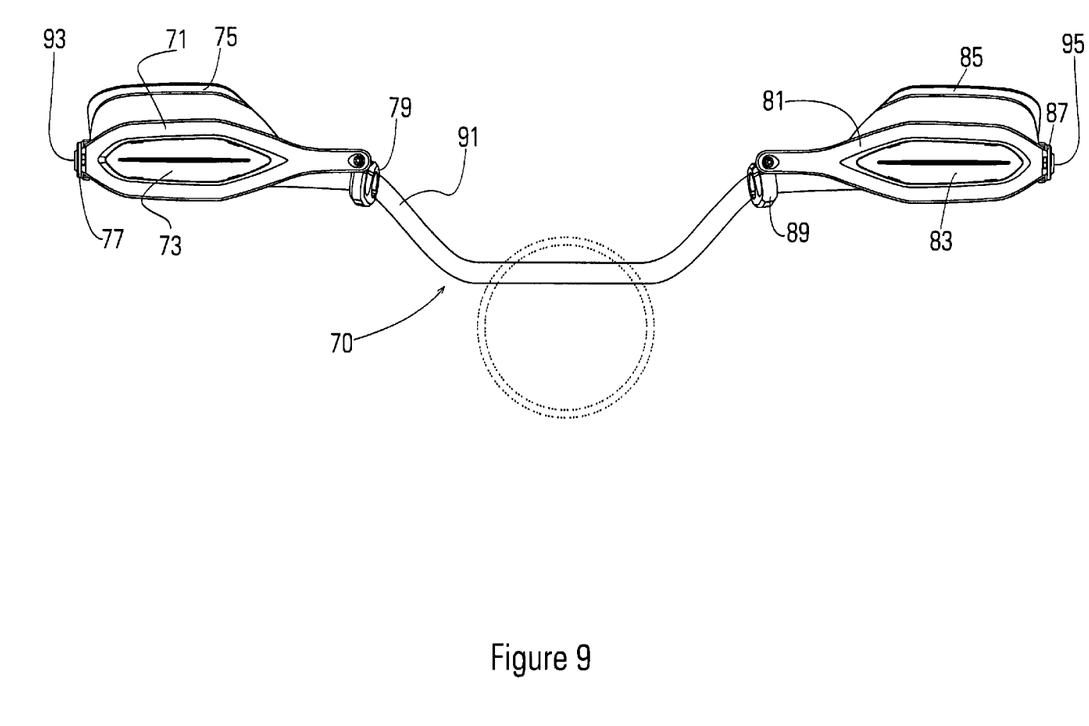
FIG. 9 is a front view of an embodiment of a present invention combination of a handlebar and two multifunctional hand guards.
Figure 10:
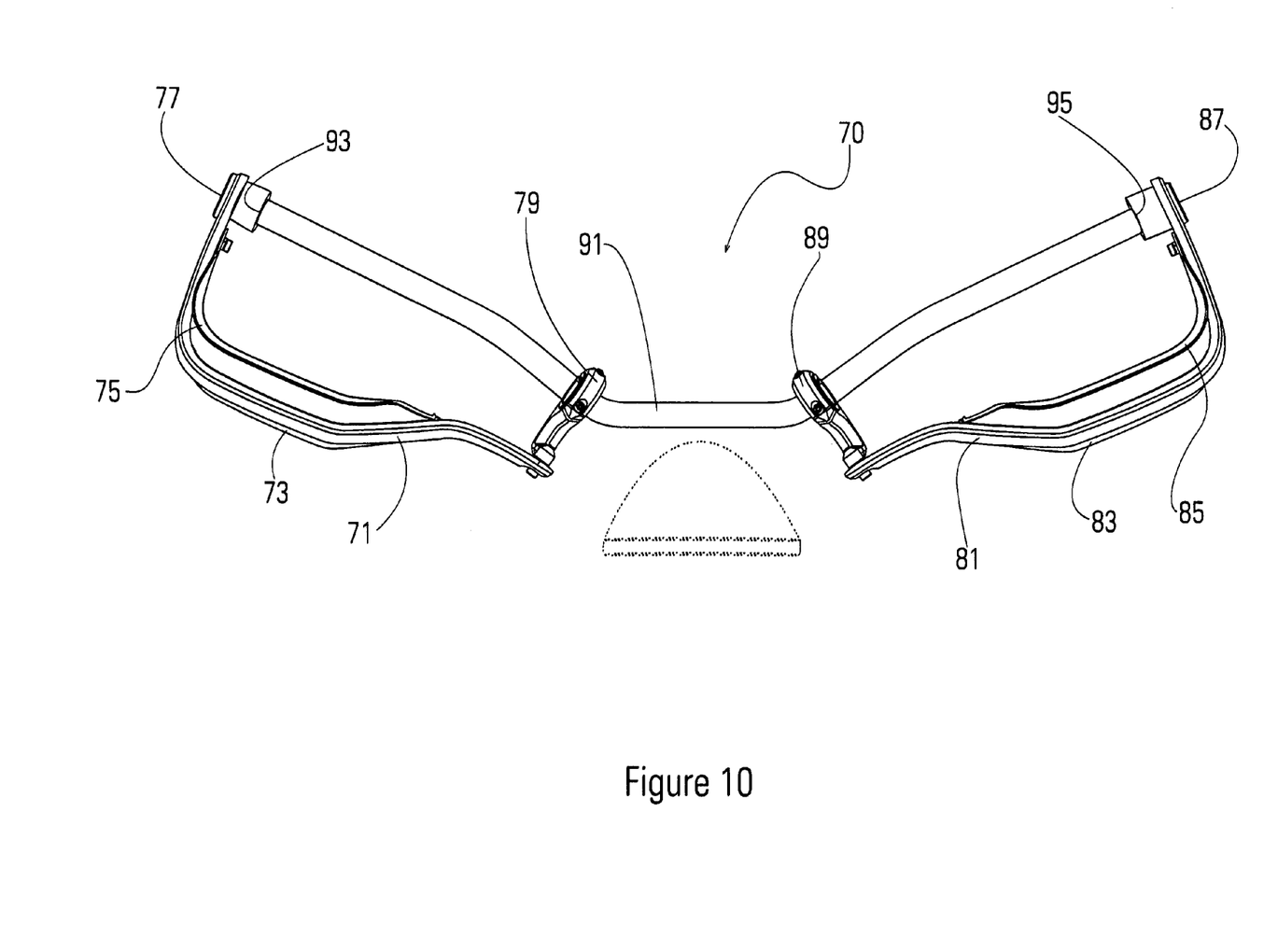

FIG. 9 is a front view of an embodiment of a present invention combination of a handlebar 91 with and two multifunctional hand guards 71 and 81, and FIG. 10 is a top view thereof. Both Figures are discussed together, here. Handlebar 91 has a right end 93 and a left end 95 (as determined from a seated position) with each of the two multifunctional hand guards 71 and 81 located at these ends respectively. Hand guard 71 has a main body structure with a cover 73 at its cutout and a shield 75 that may be raised and lowered, as well as handlebar attachment mechanisms 77 and 79. Hand guard 811 has a main body structure with a cover 83 at its cutout and a shield 855 that may be raised and lowered, as well as handlebar attachment mechanisms 87 and 89. Handlebar 91 represents the handlebar of any vehicle that has handlebars for steering, including motorized and unmotorized, hybrids and the like, for land or water transport.

Figure 11:
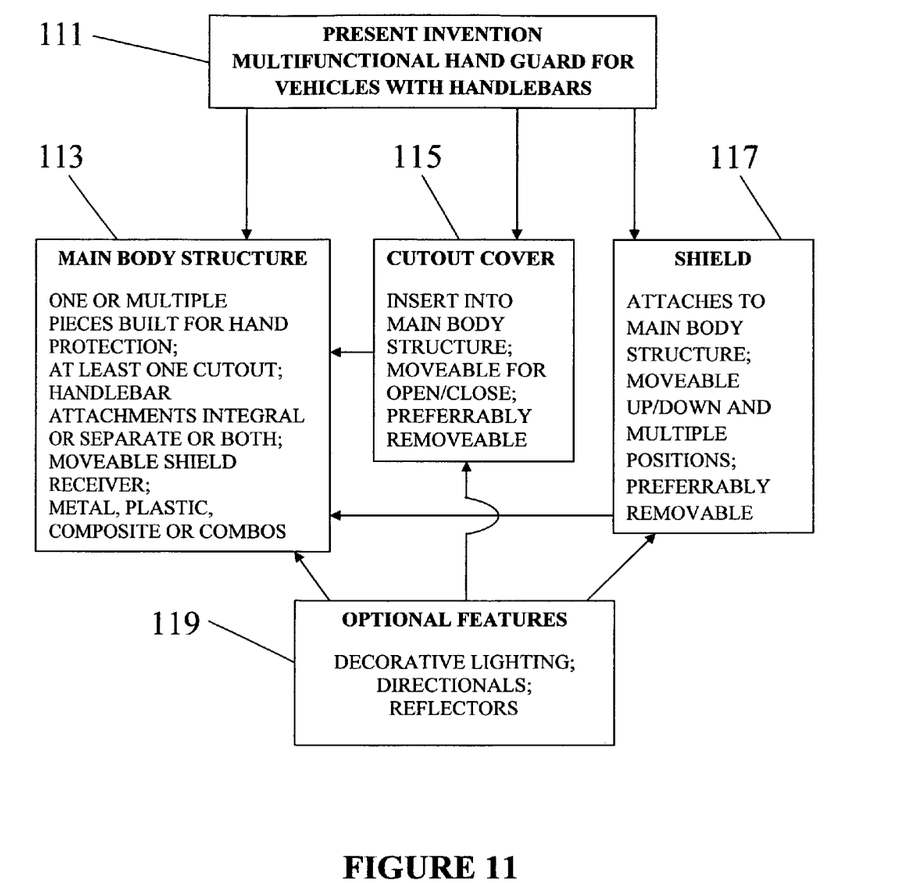

FIG. 11 shows a block diagram illustrating various components, alternatives and options for the present invention multifunctional hand guard 111, including main body structure 113, cutout cover 115 and shield 117, with each of the essential features described. Optional features 119 are also shown.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A multifunctional hand guard for a vehicle with a handlebar, said guard having at least three functional modes, which comprises:
 a) a main hand guard body structure adapted for attachment to a vehicle handlebar, said structure having a top, a bottom, a front, a back, a first side and a second side, said structure having a leading segment for positioning in front of a grip of said handlebar, said leading segment having a forward facing cutout, establishing an open area for free airflow, said structure having at least one trailing segment that extends backwardly from said leading segment for attachment to said handlebar, said structure having attachment means for attachment to said handlebar;
 b) a cutout cover removeably attachable to said main hand guard body structure at said cutout, wherein said cutout cover includes at least one spring lock, and wherein said main hand guard body structure includes at least one detent attached to said main hand guard body structure to position and secure said cover with said spring lock, and wherein said cutout cover blocks airflow there through;
 c) an adjustable guard shield moveably attachable to said main hand guard body structure at said leading segment for manual removal and attachment, wherein said adjustable guard shield is attached to said main hand guard body structure with an attachment mechanism comprising a quick release screw pivot, at least two guide tracks on said adjustable guard shield, and at least two track screws on said main hand guard body structure and passing through said at least two guide tracks, and having a first position wherein said guard shield is in a contracted position, and having a second position wherein said guard shield is in an extended position so as to increase forward shielding surface area, wherein said guard shield is moveable along said at least two track screws on said at least two guide tracks with sliding adjustment to any position between said first and second positions, and wherein said guard shield is pivotable about said quick release screw pivot.

2. The multifunctional hand guard having at least three functional modes, of claim 1 wherein said trailing segment of said structure has an orifice for attachment to a handlebar.

3. The multifunctional hand guard having at least three functional modes, of claim 1 wherein said attachment means is established by two different parts and includes an attachment mechanism to attach said two different parts to one another.

4. The multifunctional hand guard having at least three functional modes, of claim 1 wherein said guard shield is removable.

5. The multifunctional hand guard having at least three functional modes, of claim 1 wherein said cutout cover has at least one forward facing illumination component selected from the group consisting of reflectors, decorative lighting, directional lights and combinations thereof.

6. The multifunctional hand guard having at least three functional modes, of claim 1 wherein said leading segment has at least one forward facing illumination component selected from the group consisting of reflectors, decorative lighting, directional lights and combinations thereof.

7. The multifunctional hand guard having at least three functional modes, of claim 1 wherein said structure side has at least one side facing illumination component selected from the group consisting of reflectors, decorative lighting, directional lights and combinations thereof.

8. The multifunctional hand guard having at least three functional modes, of claim 1 wherein said main hand guard body structure is symmetrical at least along a horizontal center line so as to be invertible and thereby useable on ether a left side or a right side of said handlebar.

9. The multifunctional hand guard having at least three functional modes, of claim 1 wherein said structure is of a material selected from the group consisting of plastic, aluminum, fiber and combinations thereof.

10. The multifunctional hand guard having at least three functional modes, of claim 1 wherein said structure is an aluminum structure selected from the group consisting of cast aluminum, forged aluminum and machined aluminum.

11. In combination, a handlebar for steering a vehicle and two multifunctional hand guards having at least three functional modes attached to said handlebar, which includes:
  A) a handlebar having a left side and a right side, and being attached to a vehicle that is steerable with said handlebar; and,
  B) two multifunctional hand guards, one attached to said left side of said handlebar and one attached to said right side of said handlebar, each of said two multifunctional hand guards including:
  a) a main hand guard body structure adapted for attachment to a vehicle handlebar, said structure having a top, a bottom, a front, a back, a first side and a second side, said structure having a leading segment for positioning in front of a grip of said handlebar, said leading segment having a forward facing cutout, establishing an open area for free airflow, said structure having at least one trailing segment that extends backwardly from said leading segment for attachment to said handlebar, said structure having attachment means for attachment to said handlebar;
  b) a cutout cover removeably attachable to said main hand guard body structure at said cutout, wherein said cutout cover includes at least one spring lock, and wherein said main hand guard body structure includes at least one detent attached to said main hand guard body structure to position and secure said cover with said spring lock, and wherein said cutout cover blocks airflow there through;
  c) an adjustable guard shield moveably attachable to said main hand guard body structure at said leading segment for manual removal and attachment, wherein said adjustable guard shield is attached to said main hand guard body structure with an attachment mechanism comprising a quick release screw pivot, at least two guide tracks on said adjustable guard shield, and at least two track screws on said main hand guard body structure and passing through said at least two guide tracks, and having a first position wherein said guard shield is in a contracted position, and having a second position wherein said guard shield is in an extended position so as to increase forward shielding surface area, wherein said guard shield is moveable along said at least two track screws on said at least two guide tracks with sliding adjustment to any position between said first and second positions, and wherein said guard shield is pivotable about said quick release screw pivot.

12. The combination of a handlebar for steering a vehicle and two multifunctional hand guards having at least three functional modes attached to said handlebar of claim 11 wherein each of said trailing segment of said structures has an orifice for attachment to said handlebar.

13. The combination of a handlebar for steering a vehicle and two multifunctional hand guards having at least three functional modes attached to said handlebar of claim 11 wherein each of said multifunctional hand guard attachment means is established by two different parts and includes an attachment mechanism to attach said two different parts to one another.

14. The combination of a handlebar for steering a vehicle and two multifunctional hand guards having at least three functional modes attached to said handlebar of claim 11 wherein said guard shield is removable.

15. The combination of a handlebar for steering a vehicle and two multifunctional hand guards having at least three functional modes attached to said handlebar of claim 11 wherein each of said multifunctional hand guards has at least one illumination component selected from the group consisting of reflectors, decorative lighting, directional lights and combinations thereof.

16. The combination of a handlebar for steering a vehicle and two multifunctional hand guards having at least three functional modes attached to said handlebar of claim 11 wherein each of said guard shields in its first position extends upwardly above said main hand guard body structure.

* * * * *